Aug. 18, 1925.
C. V. SCHMITT
1,550,284
TOOL FOR RELOADING AMMUNITION FOR PISTOLS, RIFLES, AND THE LIKE
Filed May 15, 1924　　　7 Sheets-Sheet 1
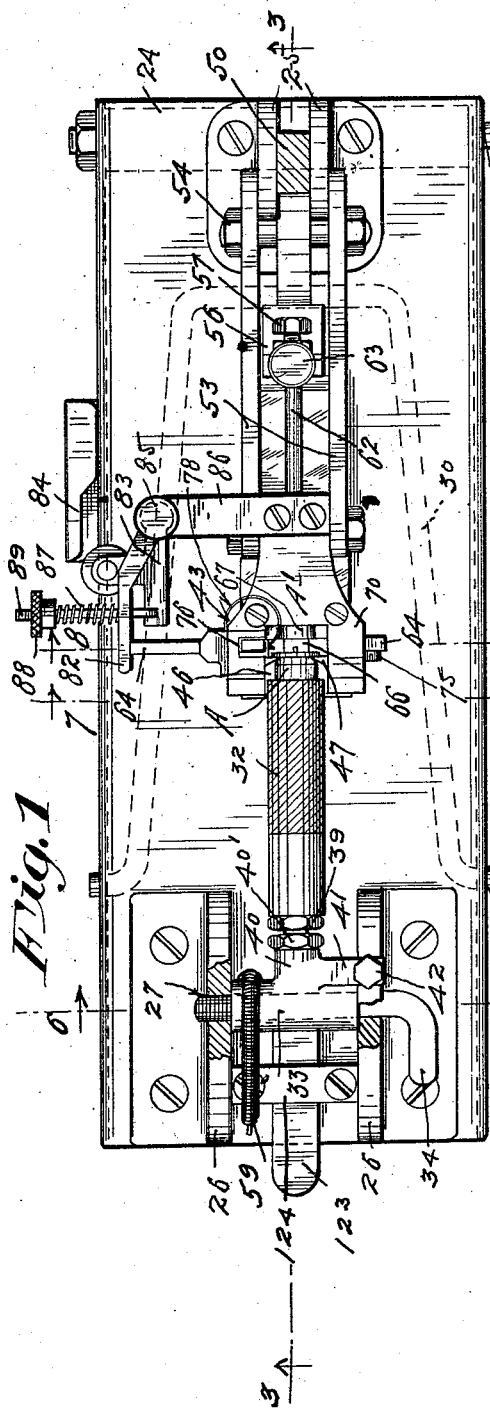
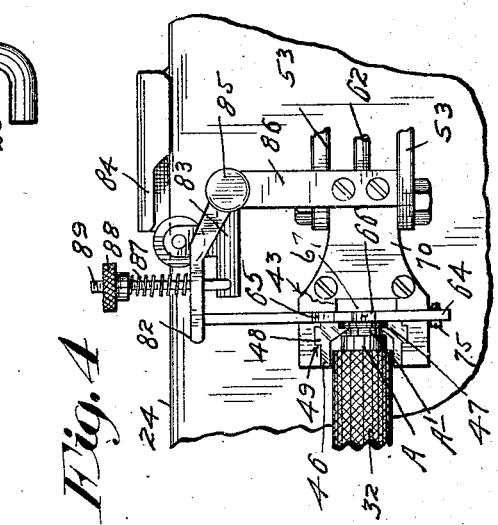
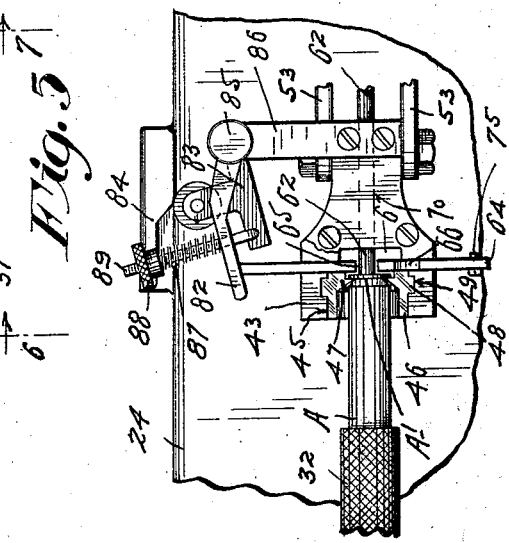
Inventor
Constantine V. Schmitt
By his Attorneys
Merchant & Killam

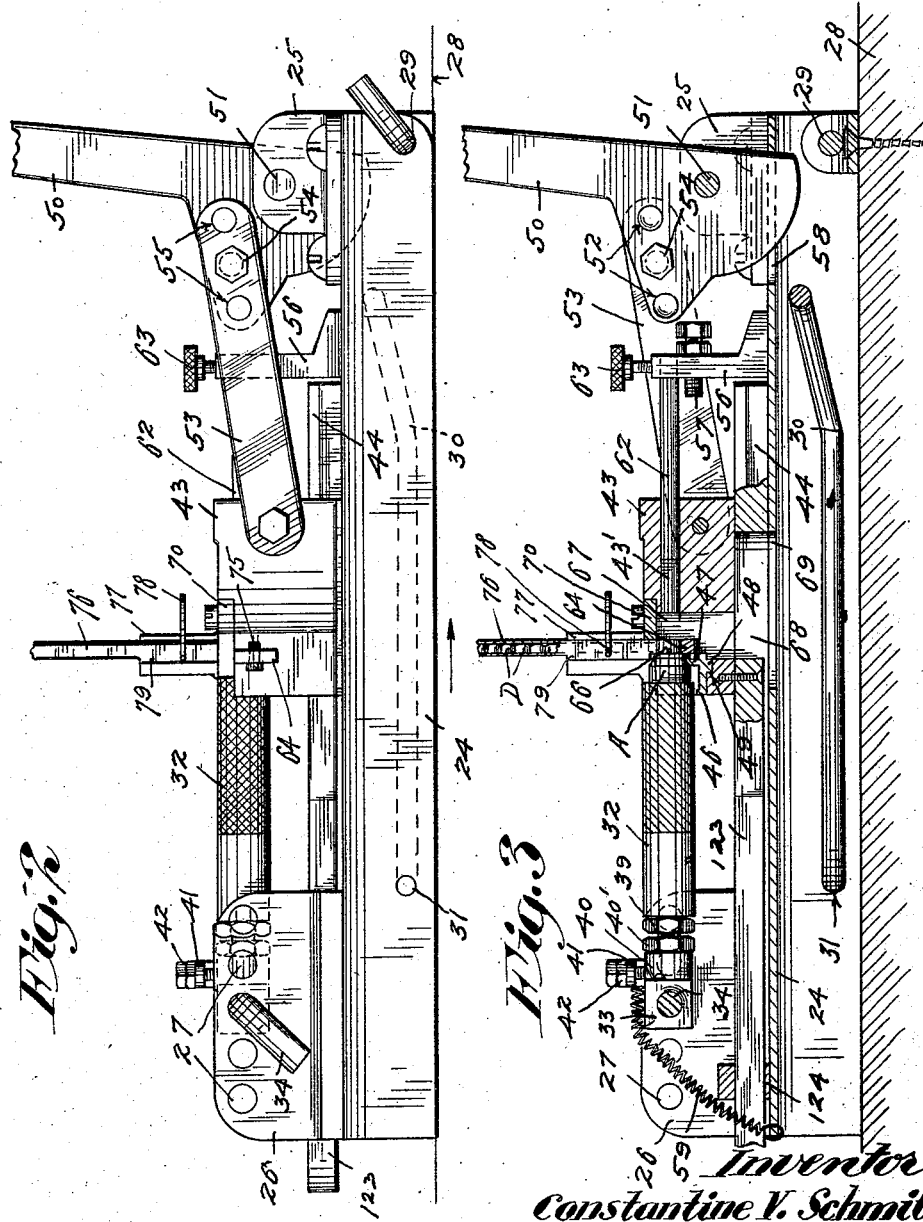

Aug. 18, 1925. 1,550,284
C. V. SCHMITT
TOOL FOR RELOADING AMMUNITION FOR PISTOLS, RIFLES, AND THE LIKE
Filed May 15, 1924   7 Sheets-Sheet 3
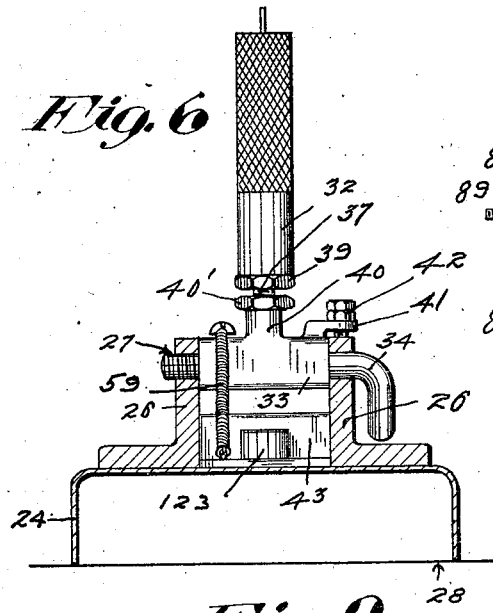
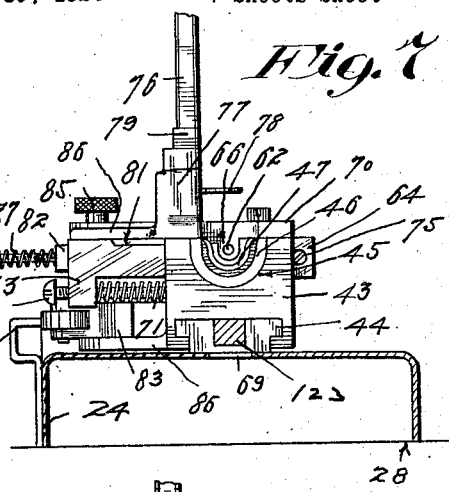
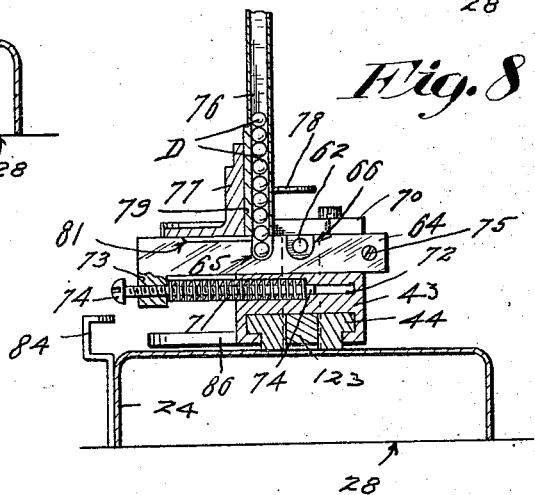
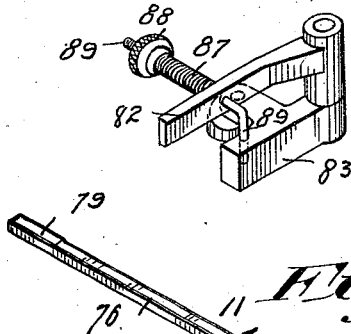
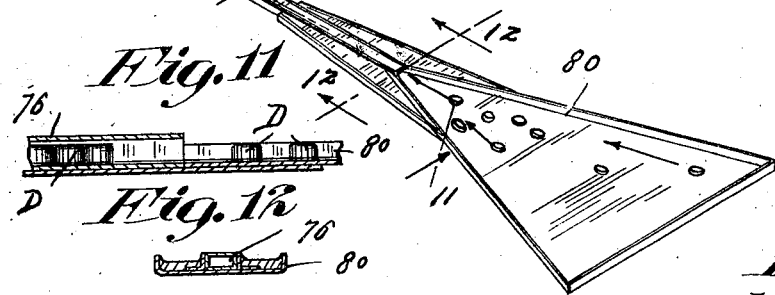
Inventor
Constantine V. Schmitt
By his Attorneys
Merchant and Kiefer

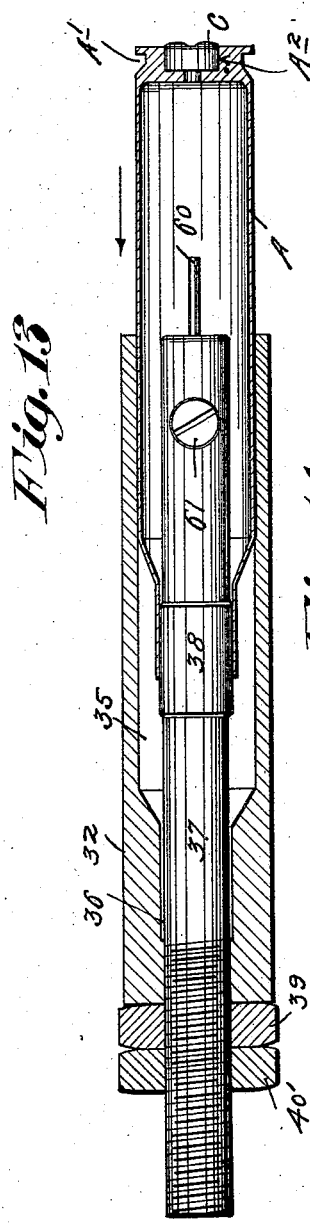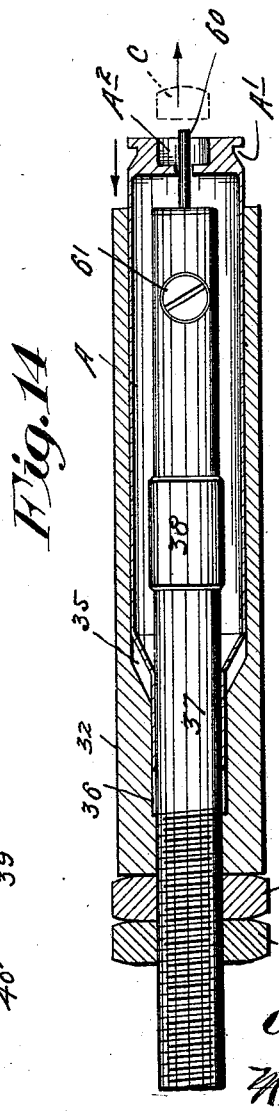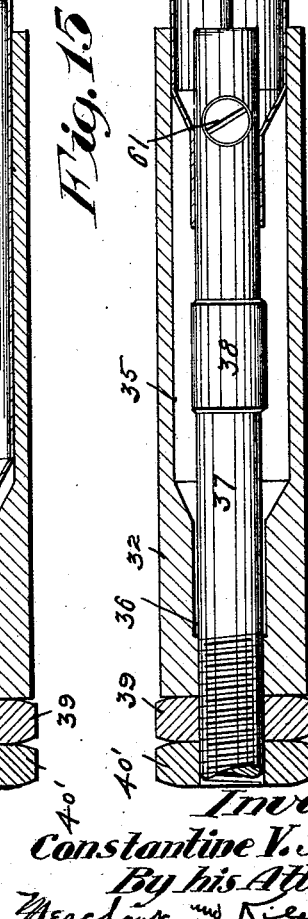

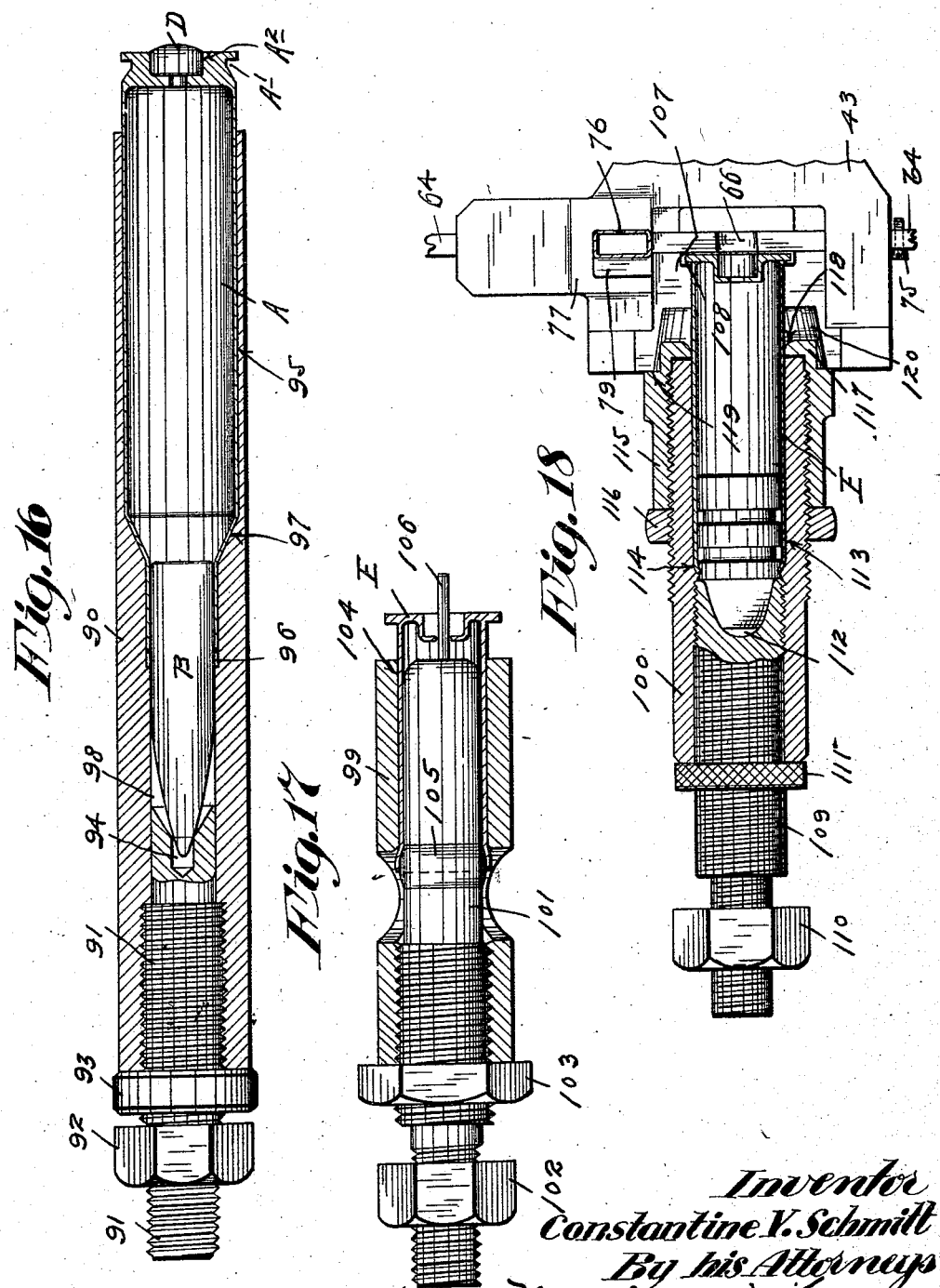

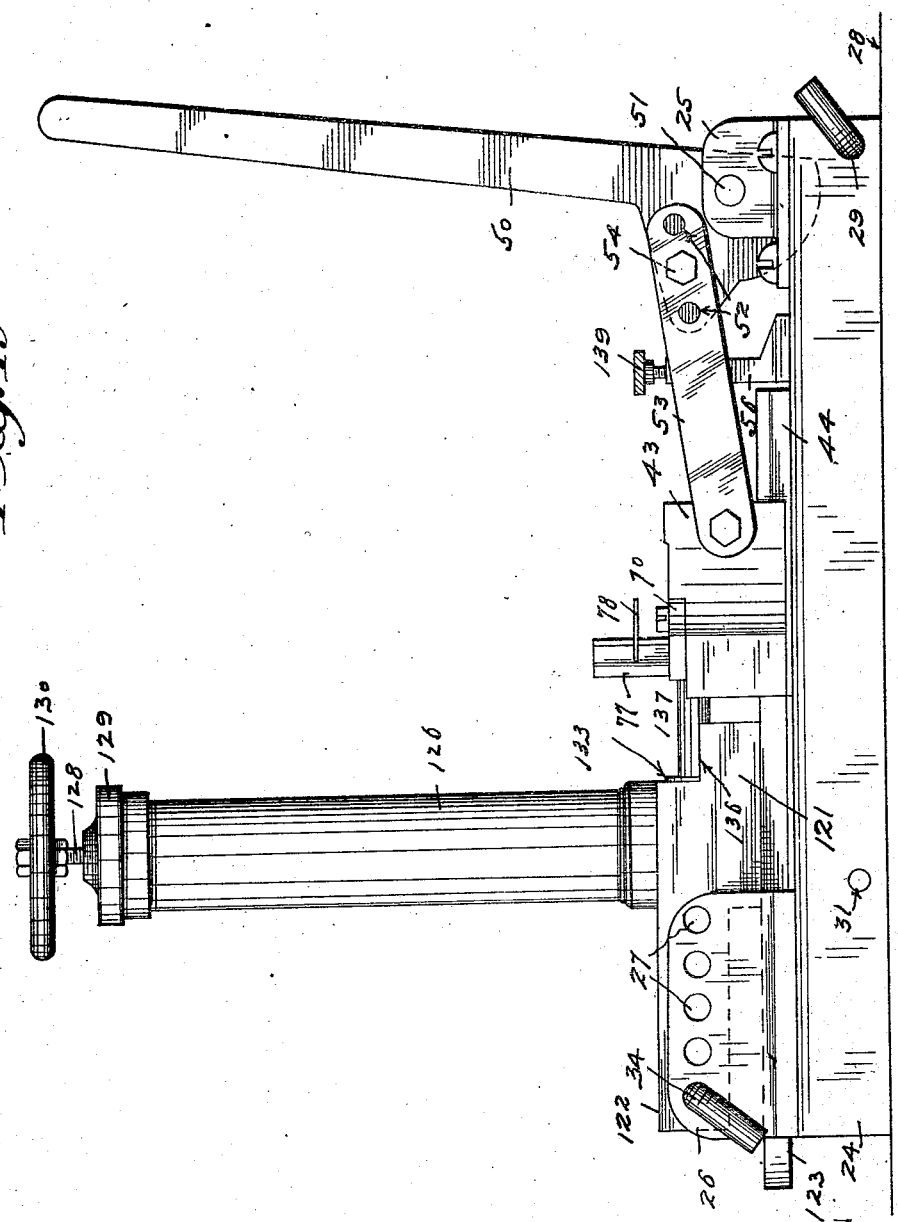

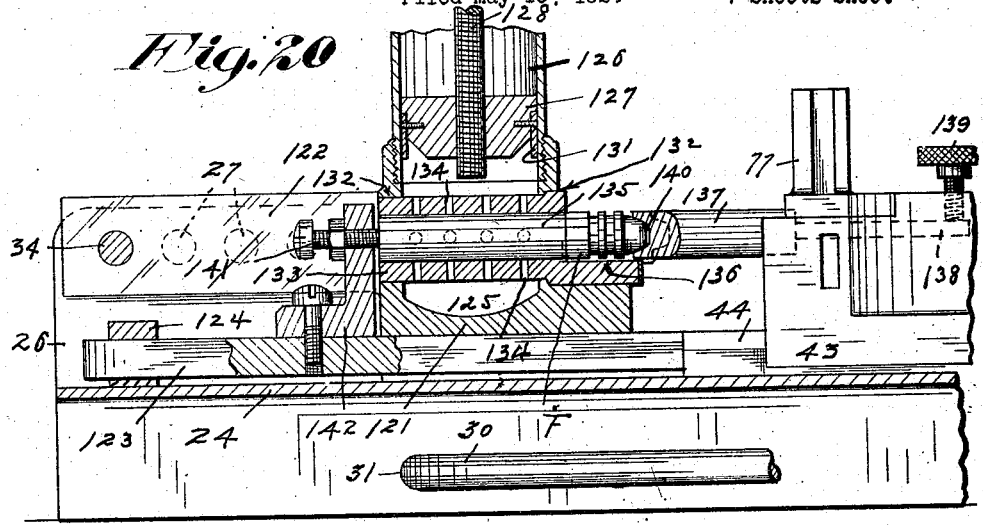
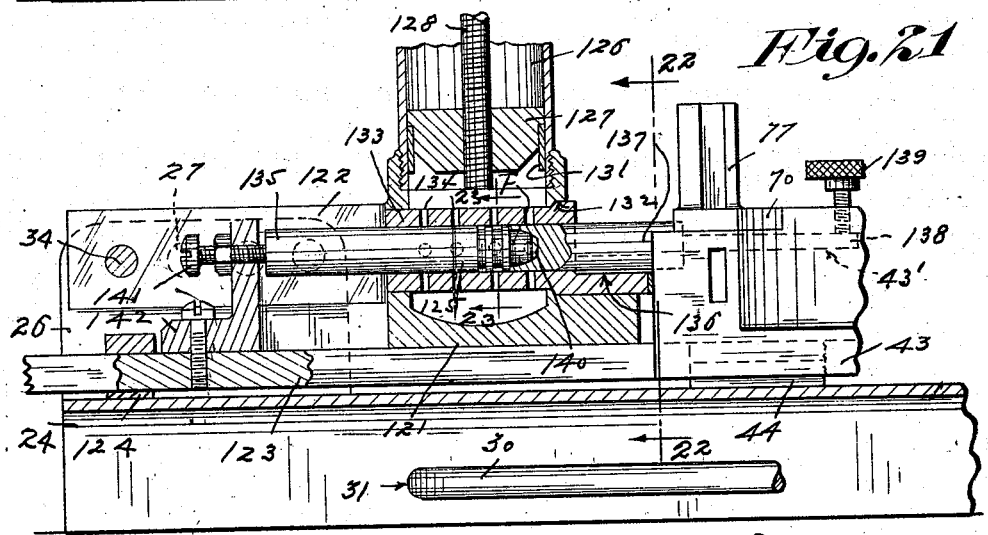
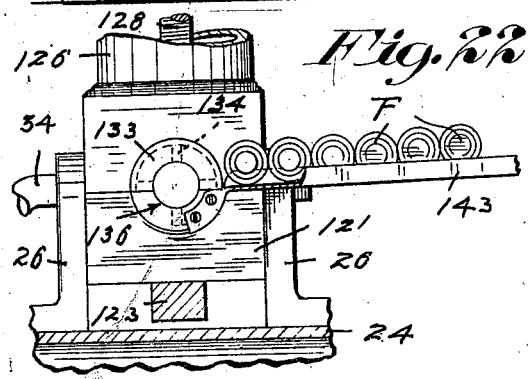
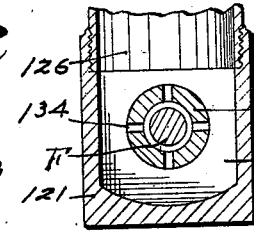

Patented Aug. 18, 1925.

1,550,284

UNITED STATES PATENT OFFICE.

CONSTANTINE V. SCHMITT, OF MINNEAPOLIS, MINNESOTA.

TOOL FOR RELOADING AMMUNITION FOR PISTOLS, RIFLES, AND THE LIKE.

Application filed May 15, 1924. Serial No. 713,548.

*To all whom it may concern:*

Be it known that I, CONSTANTINE V. SCHMITT, a citizen of the United States, residing at Minneapolis, in the county of Hennepin and State of Minnesota, have invented certain new and useful Improvements in Tools for Reloading Ammunition for Pistols, Rifles, and the like; and I do hereby declare the following to be a full, clear, and exact description of the invention, such as will enable others skilled in the art to which it appertains to make and use the same.

My invention relates to tools for reloading ammunition for pistols, rifles, and the like and has for its object to improve the same in the several particulars hereinafter stated.

To the above end the invention consists of the novel devices and combinations of devices hereinafter described and defined in the claims.

In the accompanying drawings, which illustrate the invention, like characters indicate like parts throughout the several views.

Referring to the drawings:

Fig. 1 is a plan view of the improved tool set in a decapping position;

Fig. 2 is a front elevation of the same;

Fig. 3 is a view partly in front elevation and partly in longitudinal section taken on the line 3—3 of Fig. 1;

Fig. 4 is a fragmentary plan view of the sliding head and parts associated therewith positioned as shown in Fig. 1;

Fig. 5 is a view corresponding to Fig. 4 but showing the parts adjusted into a recapping position;

Fig. 6 is a view partly in elevation and partly in transverse vertical section taken on the line 6—6 of Fig. 1 with the resizing die turned into a receiving position;

Fig. 7 is a view partly in elevation and partly in transverse vertical section taken on the line 7—7 of Fig. 1;

Fig. 8 is a view partly in elevation and partly in transverse vertical section taken on the line 8—8 of Fig. 1;

Fig. 9 is a perspective view of the cam actuated device for projecting the cap feeding slide;

Fig. 10 is a perspective view of the cap magazine removed from the tool and attached to a filling tray;

Fig. 11 is a fragmentary detail view in section taken on the line 11—11 of Fig. 10 on an enlarged scale;

Fig. 12 is a detail view in transverse section taken on the line 12—12 of Fig. 10 on an enlarged scale;

Fig. 13 is a detail view, on an enlarged scale, of the resizing die and decapping pin and also showing a shell case of the bottle neck type partly projected therein and showing the method of expanding the neck of said sheet case during the resizing of its body;

Fig. 14 is a view corresponding to Fig. 13 but showing the shell case further projected into the die and showing the process of resizing the neck of the shell case externally and decapping said shell case, the ejected cap being indicated by means of broken lines;

Fig. 15 is a view corresponding to Figs. 13 and 14 but showing the shell case during its extracting movement to resize its neck externally and recap said shell case and further showing a cap held by the recapping pin to be pressed into its seat in the shell case during the final extracting movement of said shell case;

Fig. 16 is a view principally in longitudinal central section showing a die for holding and aligning a bottle neck shell case and metal case bullet;

Fig. 17 is a view corresponding to Fig. 13 but showing a die for resizing a shell case having a straight skirt and opening the bullet-retaining crimp therein;

Fig. 18 is a view corresponding to Fig. 16 but showing a die for holding and aligning a shell case having a straight skirt and a lead bullet and crimping said shell case, said view also shows a portion of the movable head, cap magazine and cap feeding slide;

Fig. 19 is a front elevation of the tool adjusted to resize and grease lead bullets;

Fig. 20 is a fragmentary view of the tool, as shown in Fig. 19, principally in longitudinal central vertical section, with a lead bullet positioned to be moved into the resizing die and greased;

Fig. 21 is a view corresponding to Fig. 20 but showing the bullet in the resizing die;

Fig. 22 is a view partly in elevation and partly in transverse vertical section taken on the line 22—22 of Fig. 21; and Fig. 23 is a detail view in section taken on the line 23—23 of Fig. 21.

Referring first to the improved tool as shown in Figs. 1 to 16, inclusive, the numeral 24 indicates a hollow base having at its right and left-hand ends pairs of upstanding laterally spaced bearing lugs 25 and 26, respectively, the latter pair of which has a plurality of horizontally spaced pairs of seats 27. This base 24 is removably secured at its right-hand end to a bench or other support 28 by a separable hinge 29 for vertical swinging movement. The arms of a bail 30 are pivoted at 31 to the front and back flanges of the base 24 for vertical swinging movement. Normally this bail 30 is folded into the hollow base 24 and may be swung downward and to the left into an inclined position with its free or transverse portion on the bench 28 to support the tool in an oblique position for a purpose that will presently appear.

A horizontal resizing die 32 for shell cases A, of the bottle neck type, is carried by a crosshead 33 for swinging movement into an upstanding position. This crosshead 33 is pivoted on a horizontal hinge bolt 34 mounted in one of the pairs of seats 27, has screw-threaded engagement with the rear bearing lug 26, and is provided with a crank-like head by which it may be turned. Said hinge bolt 34 may be mounted in any one of the pairs of seats 27 to adjust the resizing die 32 axially. It may be here stated that shell cases of this type carry metal case bullets B held therein by friction. The resizing die 32 has in its front end portion a cylindrical chamber 35 for resizing the body of the shell case A during the movement of said shell case into the resizing die, as shown in Figs. 13 and 14. Rearward of the chamber 35 is a second cylindrical chamber 36 of reduced diameter for resizing the neck of the shell case A, as shown in Fig. 14. The mouth of the chamber 36 is beveled to direct the neck of the shell case A therein.

The resizing die 32 also includes a mandrel 37 that extends axially into said die from the rear thereof and has screw-threaded engagement therewith rearward of the chamber 36. Formed with this mandrel 37, within the chamber 36, is a cylindrical expanding plug 38, as shown in Fig. 13. During the extracting movement of the shell case A, from the resizing die 32, the neck of said shell case is drawn over the expanding plug 38 and resized internally. By rotating the mandrel 37 in respect to the resizing die 32, the same may be projected or retracted axially in said die, and which die is held from turning on said mandrel by a lock nut 39.

The rear projecting end portion of the mandrel 37, is screwed into a radial boss 40 on the crosshead 33 and detachably supports the resizing die 32. A lock nut 40' on the mandrel 37 impinges against the boss 40 and holds said mandrel from turning in respect to the crosshead 33. A stop finger 41 on the boss 40 engages the front bearing lug 26 and limits the upward swinging movement of the resizing die 32, and a set screw 42, having screw-threaded engagement with said stop finger, engages said bearing lug as a stop for vertically adjusting the resizing die 32 in a recapping position.

For forcing the shell case A into the resizing die 32 and then extracting the same, there is provided a head 43 slidably mounted on a longitudinal way 44 on the base 24. To connect the shell case A to the sliding head 43 there is removably mounted in a segmental seat 45 in said head (see Fig. 7) a segmental bushing 46 having a segmental lock flange 47 arranged to fit into the peripheral rim groove $A^1$ in the rim of said shell case. This bushing 46 is held against axial movement on the sliding head 43 by a segmental flange 48 formed therewith and seated in a correspondingly formed channel 49 in said head. It will be noted that the lock flange 47 is beveled at its front face so as to fit into the rim grooves in shell cases that may vary slightly as to size.

A lever 50 for operating the sliding head 43 is extended between the bearing lugs 25 and fulcrumed thereto at 51. This operating lever 50 is provided with a plurality of circumferentially spaced holes 52 located different radial distances from the fulcrum 51. Said lever 50 is connected to the sliding head 43 by a pair of laterally spaced links 53. A nut-equipped bolt 54 pivotally and detachably connects the links 53 to the operating lever 50 and may be inserted through any one of the holes 52 to change the speed and power at which the head 43 may be moved by said lever. It is important to note that the lever 50 exerts the greatest power on the head 43 during the final movement of the shell case A with the die 32 and during the initial extracting movement thereof, at which time it is needed. The bolt 54 may be inserted through any one pair of a plurality of longitudinally spaced holes 55 in said links to vary their operative length and position the sliding head 43 different distances from the die 32.

Secured to the base 24 between the way 44 and operating lever 50 is a post 56 with which a screw has threaded engagement to afford an adjustable stop 57 to limit the return movement of the sliding head 43. The forward movement of the sliding head 43 is limited by the engagement of the lower end of the operating lever 50 with the base 24 at the end of a slot 58 therein. A spring 59 anchored to the base 24 and attached to the crosshead 33 holds the resizing die 32 in an inoperative upright position, with its stop finger 41 in engagement with the respective bearing lug 26, but will yield and permit said die to be moved into a horizontal operative position and will return said die when released to its original position.

To decap the shell case A there is mounted in the end of the mandrel 37 at the mouth of the chamber 35 a decapping pin 60 axially aligned with said mandrel and held by a set screw 61. This decapping pin 60 becomes operative to decap the shell case A during the final projecting movement of the shell case A into the resizing die 32 to resize its neck in the chamber 36 as indicated in Fig. 14, and in which view the removed cap C is indicated by broken lines.

The recapping of the shell case A is performed by a recapping pin 62, the right end of which is mounted in a bore in the post 56 and held by a set screw 63 in different axial adjustments. The forward end portion of the recapping pin 62 is slidably mounted in a bore-like seat formed in the head 43. It may be here stated that the resizing die 32, when in an operative position, decapping pin 60, bushing 46, and recapping pin 62 are all in true horizontal axial alignment. The axial adjustment of the recapping pin 62 is highly important in that it determines the distance a cap may be pressed into the cap seat in a shell case.

A cap D is automatically positioned by a feed slide 64 where it will be brought into engagement with the recapping pin 62 and pressed into the seat $A^2$ in the shell case A provided therefor, as shown in Fig. 15. The recapping of the shell case A takes place during the final extracting movement of said shell case by the sliding head 43. The cap feeding slide 64 is mounted for transverse horizontal sliding movement in a seat in the sliding head 43, just back of the bushing 46, and has in its upper edge portion a transverse notch-like pocket 65 of such size and shape as to hold a single cap D. This pocket 65 also affords clearance for the recapping pin 62 during the recapping action. There is also formed in the upper edge portion of the feed slide 64 a second notch which affords a passageway 66 through which the caps are discharged after their removal from shell cases by the decapping pin 60, as indicated in Fig. 14. From this passageway 66 caps are precipitated into the hollow base 24 through a vertical opening 67 in the sliding head 43, the bifurcated front end portion 68 of the way 44 and a slot 69 in the top of said base.

A removable cover plate 70 on the sliding head 43 holds the bushing 46 and the feed slide 64 in their respective seats. The feed slide 64 is yieldingly held in a retracted position by a coil spring 71 mounted in the bore-like recess 72 in the sliding head 43 and reacting against a depending lug 73 on said slide. This spring 71 encircles and is held in position by a long adjusting screw 74 which has screw-threaded engagement with the lug 73 and is free to move axially in the seat 72.

The feed slide 64 is provided with a stop 75 arranged to engage the sliding head 43 as an abutment to limit the retracting movement of said slide under the action of the spring 71. This stop 75 positions the feed slide 64 with its passageway 66 in alignment with the decapping pin 60 and recapping pin 62. In this retracted position of the feed slide 64, its cap pocket 65 is positioned under the open lower end of an upright magazine 76 of such size as to hold the caps D in a vertical column, the one upon the other, as best shown in Fig. 8.

The lower end portion of the magazine 76 is removably telescoped into an upstanding sleeve-like seat 77 formed with the cover 70. The side of the seat 77 adjacent to the passageway 66 in the feed slide 64 is open and a leaf spring 78 attached to said seat engages the magazine 76 and yieldingly holds the same in an upright position. The purpose of this open side in the seat 77 and the spring 78 is to yieldingly hold the magazine 76 and allow the same to move the feed slide 64 into an oblique position and release a cap D in case the same should be so positioned as to form a connector between said slide and magazine and thereby prevent the crushing of said cap, under the moving action of the feed slide which might result in exploding the same. By reference to Fig. 8, it will be noted that the left-hand side of the magazine 76, within the seat 77, is built out at 79 and properly positions the magazine 76 over the cap pocket 65. It may be here stated that there will have to be a magazine 76 for each of the different sizes of caps D, and hence all the magazines must be of the same size in cross section at their lower end portions so as to properly fit within the seat 77. The magazine 76 is filled with caps D by means of a tray 80 having a contracted delivery throat into which the upper end of the magazine 76 is detachably secured, as shown in Fig. 10.

The caps D on the tray 80 are fed by hand into the magazine in their proper position.

The feed slide 64 has a reduced surface 81 on its upward edge which extends rearward from the cap pocket 65 and on which surface the column of caps D is supported during the projecting and retracting movements of said slide.

At the completion of the projecting movement of the feed slide 64, the cap D in the pocket 65 is removed from said seat by the recapping pin 62 and pressed into the seat $A^2$ provided therefor in the shell case A. At the completion of the retracting movement of the feed slide 64 its pocket 65 is again positioned under the magazine 76 and the lowermost cap D dropped therein, as shown in Fig. 15. The placing of the magazine 76 in an off-set position in respect to the recapping pin 62 and carrying the caps one at a time to said pin is for safety's sake to prevent a cap, in case the same is exploded by said pin, from exploding all of the caps in the magazine.

To project the feed slide 64 during the retracting movement of the sliding head 43 and thereby carry a cap D from the magazine 76 to the recapping pin 62, there is provided a long upper arm 82 and short lower arm 83 in bell crank arrangement. The free end of the long arm 82 engages the rear end of feed slide 64 and the short arm 83 is roller-equipped for engagement with a cam plate 84 on the base 24. These two arms 82 and 83 are mounted on an upright pivot 85, secured in upper and lower bearings 86 on the sliding head 43, for independent, horizontal swinging movement. The two arms 82 and 83 are yieldingly connected for common swinging movement under normal conditions of the tool by a coiled spring 87 compressed between the arm 82 and a thumb nut 88 having screw-threaded engagement with a rod 89 which projects loosely through an aperture in the arm 82 and is pivoted at its head to the arm 83. The spring 87 is held in position by the bolt 89 and the tension thereof may be varied, at will, by adjusting the thumb nut 88.

During the retracting movement of the sliding head 43, the roller-equipped arm 83 will engage the cam plate 84 and thereby swing the arm 82 by means of the spring connection 87 to project the feed slide 64. During the projecting movement of the sliding head 43 the roller-equipped arm 83 is again moved out of engagement with the cam plate 84 and at which time the spring 71 retracts the feed slide 64, and which slide again returns the arms 82 and 83 to normal positions. In case a cap should get out of position or is deformed and thereby interrupts the movement of the feed slide 64, the spring connector 87, between the two arms 82 and 83, will yield and thereby permit the arm 83 to be moved by the cam plate 84 independently of the arm 82 without applying undue pressure to the feed slide 64 which, if moved, might explode the cap interrupting the movement thereof.

This spring connector 87 also performs another important function, in that it takes up all lost motion due to wear or otherwise and securely holds the feed slide 64 during the recapping action. When the projecting movement of the feed slide 64 is brought to a stop by the adjusting screw 74, the cam plate 84 will continue to move the arm 83 independently of the arm 82 and thereby increase the tension of the spring 87 which, acting on the arm 83, will securely hold the feed slide 64, at which time it is held properly adjusted by the screw 74 to align a cap in its pocket 65 and with the cap seat in the shell case A.

The operation of the improved tool thus far described may be briefly described as follows:

The used shell case A is inserted into the chamber 35 of the resizing die 32 which, at this time, is yieldingly held in an upright position by the spring 59. Said resizing die 32 is then swung downward into a horizontal position to interlock the rim groove $A^1$ in the shell case A with the lock flange 47 on the bushing 46. While the operator continues to hold the resizing die 32 in a horizontal position against the tension of the spring 59, he moves the lever 50 forward and thereby projects the sliding head 43 until stopped by the engagement of the lever 50 with the stop surface on the base 24, at the slot 58. This projecting movement of the sliding head 43 first forces the shell case A into the chamber 35 to resize the body thereof. The final projecting movement of the shell case A into the resizing die 32 forces the neck of said shell into the chamber 36 and resizes the same externally. During this same time, the decapping pin 60 removes the cap C which is thrown thereby through the passageway 66 and precipitated into the hollow base 24 through the passageways 67, 68 and 69.

Next, the operator returns the lever 50 to its original position to retract the sliding head 43 and thereby extract the shell A from the resizing die 32. During this extracting movement of the shell case A from the resizing die 32, the neck of said shell case is forced over the expanding plug 38 and resized internally. At the same time the sliding head 43 is making its final retracting movement, the feed slide 64 is projected, by the arms 82 and 83 under the action of the cam plate 84, to position a cap D in front of the recapping pin 62. This cap, during the final retracting movement of the sliding head 43, is carried by the feed slide 64 against the recapping pin 62 which acts as an abutment to hold said cap while the shell case A is being moved toward said pin to receive the cap D which is forced into its seat $A^2$ and held by friction. The depth that the cap can be seated in the cap or primer pocket of the shell case is regulated by the sliding head 43 abutting against the adjusting screw 57.

At the completion of the recapping of the shell case A the resizing die 32 is released by the operator and is again returned to an upright position by the spring 59. During this return movement of the resizing die 32, the resized and recapped shell case A may be removed from said resizing die. In case the cap D, during projecting movement of the feed slide 64, engages the magazine 76, the spring 78 will yield and allow said magazine to tilt and thereby release said cap and then again be returned to normal position by said spring. As previously stated, in case a mutilated or imperfect cap holds the slide 64 during its projecting movement, the spring connection will yield and allow the slide 64 to stand still during the operation of the tool, thus preventing undue strain on the tool or the explosion of the held cap, and which cap may thereafter be removed.

After the resized and recapped shell case A is removed from the resizing die 32 a charge of powder is placed therein and thereafter the bullet B is pressed into the neck of said shell and held by friction. To press the bullet B into the neck of the shell case A there is provided a die hereinafter referred to as a gauge sleeve 90 which is interchangeably usable with the resizing die 32. Extending axially into the gauge sleeve 90 from the rear end thereof is a screw-threaded bolt 91, the outer end of which may be screwed into the boss 40 on the crosshead 33 for detachably securing said sleeve thereto. Lock nuts 92 and 93 on the bolt 90 are provided, the former to hold the bolt 91 from turning in respect to the boss 40, and the latter to hold the gauge sleeve 90 from turning on the bolt 91. In the inner end of the bolt 91 is an axial bore-like seat 94 adapted to receive the nose of the bullet B and center the same. The mouth of the seat 94 is made flaring for directing the nose of the bullet B therein at the time said bullet is dropped into the gauge sleeve 90.

In the outer end portion of the gauge sleeve 90 is a chamber 95 for the body of the shell case A, and inward of this chamber is a contracted chamber 96 for the neck of said shell. The inner end of the chamber 95 is beveled to the mouth of the chamber 96 as at 97 to afford a positioning stop with which the shoulder on said shell engages at the limit of its projecting movement into the gauge sleeve 90. Inward of the chamber 96 in the gauge sleeve 90 is a chamber 98 for the body of the bullet B. By screwing the bolt 91 into or out of the chamber 98 the depth thereof may be varied at will. It is important to note that the seat 94 and chambers 95, 96, and 98 are all axially aligned. The seat 94 also acts as an abutment to hold the bullet B while the neck of the shell case A is being forced thereon.

After the bullet B and shell case A have been placed in the gauge sleeve 90, said sleeve is swung downward to interlock the shell case A with the bushing 46 carried by the sliding head 43. A forward movement of the lever 50 will operate the sliding head 43 and thereby project the shell case A into the gauge sleeve 90 and force the neck of said shell case onto the bullet B which is held in true axial alignment with the shell case A. The axially adjusted position of the seat 94 will determine the distance which the shell case A will be forced on the bullet B.

A backward movement on the operating lever 50 will retract the sliding head 43 and thereby withdraw the shell case A and bullet B from the gauge sleeve 90 sufficiently to permit the same to be lifted from the gauge sleeve 90 when moved out of the bushing 46. It may be here stated that the true axial alignment in which the shell case A and bullet B are held at the time the bullet B is secured in the said shell case is highly important in securing accuracy in shooting. During the operation of the tool in loading shell cases, the magazine 76 and caps contained therein is removed from the tool.

To prevent the charge of powder from spilling out of the shell case A at the time the same is placed in the gauge sleeve 90, the base 24 is swung on its hinge 29 into an oblique position and thus supported by the bail 30. It will thus be seen that the gauge sleeve 90 can be held in a substantially horizontal position when placing the shell case A therein.

Referring now to Figs. 17 and 18, there is shown in Fig. 17 a resizing die 99 for resizing and decapping a shell case E having a straight skirt, and which die is interchangeably usable with the resizing die 32. In Fig. 18 is shown a gauge sleeve 100 for axially aligning the shell case E with a lead bullet F and crimping said shell case to secure the bullet F therein. A mandrel 101, forming a part of the resizing die 99, is extending axially therein from the rear, and has screw-threaded engagement therewith. The rear projecting end of the mandrel 101 may be screwed into the boss 40 on the crosshead 33 to detachably secure the resizing die 99 thereto, and which mandrel may be held against rotation in the boss 40 by a lock nut 102. In the outer end portion of the resizing die 99 is a chamber 104 for resizing the body of the shell case E and on the intermediate portion of the mandrel 101 is an annular shoulder 105 arranged for co-operation with the inner end of the chamber 104 to take the crimp out of the mouth of the shell case E. By screwing the mandrel 101 into or out of the resizing die 99, the shoulder 105 may be axially adjusted in respect to the inner end of the chamber 104. On the inner end of the mandrel 101 is a decapping pin 106.

It will be noted that the rim of the shell case E differs from the rim of the shell case A in that it projects outward of the body of said shell case, and to secure this type of shell case to the sliding head 43 there is provided a bushing 107 that is interchangeably usuable with the bushing 46 and is provided at its inner face with a segmental groove 108 for engagement with the rim of the shell case E to extract said shell case from the resizing die 99 during the retracting movement of the sliding head 43.

The gauge sleeve 100 is interchangeably usable with the gauge sleeve 90 and has screw-threaded into its rear end portion a bolt 109, the outer end portion of which is adapted to be screwed into the boss 40 to connect said gauge sleeve to the cross-head 33. A lock nut 110 on the bolt 109 is provided to hold said bolt against turning in respect to the boss 40, and a lock nut 111 on said bolt impinges against the rear end of the gauge sleeve 100 to prevent turning thereof. In the inner end of the bolt 109 is an axially located seat 112 adapted to receive the nose of the bullet F and center the same. In the forward end portion of the gauge sleeve 100 is a chamber 113 for the body of the shell E, and at the rear of this chamber is an annular cam shoulder 114. The purpose of this shoulder 114 is to crimp the shell F at its mouth and press the same into the lead bullet F, as shown in Fig. 18. By turning the bolt 109 into or out of the gauge sleeve 100 the seat 112 may be set different axial distances from the shoulder 114.

A sleeve-like bushing 115 is applied to the outer end portion of the gauge sleeve 100, has screw-threaded engagement therewith, and is held in different axially adjusted positions thereon by means of a lock nut 116 which has screw-threaded engagement with the gauge sleeve 100 and impinges against the inner end of said bushing. On the outer end of the bushing 115 is an inturned flange 117 having a beveled surface 118 for directing the shell E into the chamber 113. Said bushing 115 is also provided with a stop shoulder 119 arranged to engage the outer face of the bushing 107 as a stop to limit the projecting movement of the sliding head 43 at the time the shell case E is forced into the chamber 113 and over the bullet F, and thereby determine the crimp to be put into said shell case. During the final movement of the shell case E into the chamber 113, the mouth thereof engages the shoulder 114 and crimps the same into the lead bullet F. It will be noted that the outer face of the bushing 107 is recessed at 120 to afford clearance for the bushing 115 forward of the stop shoulder 119.

Referring now to the invention as illustrated in Figs. 19 to 23, inclusive, the improved tool is equipped to resize and grease the lead bullets F. When the tool is thus used, the crosshead 33 is removed and a block 121 substituted therefor. This block 121 is provided with a pair of laterally spaced rearwardly projecting arms 122 which are hinged to the pivot bolt 34. The block 121 is supported on a horizontal bar 123, one end of which is attached to the sliding head 43, and the other end portion of which is supported and guided by a bearing 124 on the base 24. Formed in the block 121 is a grease chamber 125 having an open top in which is secured by screw threads a grease supply cylinder 126.

Working in the cylinder 126 is a piston 127 having screw-threaded engagement with the piston rod 128 and which rod is swivelled in a cap 129 for the open top of said cylinder. A hand wheel 130 is secured to the upper projecting end of the piston rod 128 and by which hand wheel said rod may be rotated to cause the piston 127 to travel axially to the cylinder 126 and from the grease into the chamber 125. The piston 127 is provided with a depending packing ring 131 which the grease in the cylinder 126 expands, and friction holds said piston against rotation in the cylinder 126 to form a tight joint.

Formed in the front and rear walls of the chamber 125 is a pair of diametrically opposite seats 132 in which is mounted a die 133 having a horizontal cylindrical chamber for resizing the bullets F. Interchangeably usable dies 133 will be provided for different sized bullets F. Formed with the die 133 is a multiplicity of circumferentially and axially spaced radial holes 134 through which the grease in the chamber 125 is forced by the piston 127 onto the bullet F when pressed into the chamber of the resizing die 133. These holes 134 are normally closed by a cylindrical follower 135 which is free to move axially in the chamber of said die. The bullet F is axially positioned at the mouth of the chamber of the resizing die 133 by a segmental seat 136 formed with said die and is concentric therewith.

To force the bullet F into the chamber of the resizing die 133 there is provided a pin 137 substituted for the recapping pin 62 and having a reduced stem 138 which extends into the seat in the post 56 for said recapping pin 62 and is held by a set screw 139. When the improved tool is thus used, the slide 64, magazine 76 as well as the recapping pin 62 are removed. In the forward end of the pin 137 is a seat 140 for the nose of the bullet F. Obviously, during the projecting movement of the sliding head 43, the pin 137 moves the bullet F axially on the seat 136 and forces the same into the chamber of the resizing die 133. This movement of the bullet F into the resizing die 133 removes any uneven surface thereon. As the bullet is forced into the chamber of the resizing die 133, the follower 135 is moved rearward in said chamber. As the bullet F is moved into the chamber of the resizing die 133, the same is greased and during the retracting movement of the sliding block 63 the follower 135 is again returned into the chamber of the resizing die 133 by an adjustable member 141 on a bracket 142 carried by the bar 123. This movement of the follower 135 forces the bullet F from the chamber of the resizing die 133 and onto the seat 136 where it may be removed by the operator. The bullets F are delivered to the seat 136 by means of a channel-like slide 143 carried by the resizing die 133.

By the use of my improved tool, shell cases and lead bullets are resized and bullets pressed into shell cases while supported in horizontal positions and accurately aligned, which greatly facilitates in the handling of the ammunition and the accuracy with which the resizing and reloading may be done.

The improved tool, by the use of its interchangeably usable parts, may be very quickly adjusted to resize, decap, and recap different sizes and types of shell cases, reload different sizes and types of shell cases and bullets and resize and grease lead bullets.

What I claim is:

1. In a tool of the kind described, the combination with a die, of means for forcing a shell case into the die and extracting the same, said die being arranged to externally resize the mouth of the shell case during the movement of the shell case into the die and to internally resize said mouth during the extracting movement of the shell case out of the die.

2. The structure defined in claim 1 in which said die is arranged to externally resize the body of the shell case during its movement into the die.

3. In a tool of the kind described, the combination with a die having inner and outer chambers and a mandrel having an expanding plug, of means for forcing a shell case having a contracted neck into the die and extracting the same, said inner and outer chambers being arranged to externally resize, respectively, the neck and body of the shell case during its movement into the die, said expanding plug being arranged to pass through the neck of the shell case and into its body before said neck is externally resized and to internally resize said neck during the extracting movement of the shell case from the die.

4. In a tool of the kind described, the combination with a die having a chamber, a mandrel extending axially into said chamber and having an expanding plug, and means for forcing a shell case into the die and extracting the same, said chamber being arranged to resize a shell case externally during its movement into the die, said expanding plug being arranged to enter the body of the shell case during its movement into the die and to internally resize the mouth of the shell case during its extracting movement from the die.

5. The structure defined in claim 4 in further combination with means for axially adjusting the expanding plug in respect to the die.

6. The structure defined in claim 4 in further combination with a decapping pin carried by the mandrel and operative to remove a cap from the shell case during its movement into the die.

7. In a tool of the kind described, the combination with a base, of a crosshead hinged to bearing lugs on the base for vertical swinging movement, interchangeably usable dies carried by the crosshead, and means for forcing a shell case into the die and extracting the same.

8. The structure defined in claim 7 in further combination with an adjustable stop for positioning the crosshead to axially align the die carried thereby.

9. The structure defined in claim 7 in further combination with means for axially adjusting the die on the cross-head.

10. In a tool of the kind described, the combination with a die, of a movable head having interchangeably usable bushings for holding shell cases of different sizes, said head affording a direct base of reaction for the bushings, and means for operating said head to force a shell case into the die and extract the same.

11. In a tool of the kind described, the combination with a die, of a movable head having means for attaching a shell case thereto, a laterally offset cap magazine, means for operating the movable head to force a shell case into the die and extract the same, a recapping pin, and automatic means for removing a cap from the magazine and positioning the same for the recapping pin.

12. In a tool of the kind described, the combination with a die, of a movable head having means for attaching a shell case thereto, a laterally offset cap magazine, means for operating the movable head to force a shell case into the die and extract the same, a recapping pin, and automatic yielding means for removing a cap from the magazine and positioning the same for the recapping pin.

13. The structure defined in claim 11 in which said magazine is yieldingly held with freedom to move into a cap-releasing position.

14. In a tool of the kind described, the combination with a die, of a movable head having means for attaching a shell case thereto, means for operating the movable head to force a shell case into the die and extract the same, a recapping pin, means for positioning a cap for the recapping pin, and positive means for adjusting the die to align the same with a positioned cap.

15. In a tool of the kind described, the combination with a die, of a movable head having means for attaching a shell case thereto, means for operating the movable head to force a shell case into the die and extract the same, a fixed recapping pin, means for positioning a cap for the recapping pin, and means for axially adjusting the recapping pin in respect to the die and head.

16. In a tool of the kind described, the combination with a die, of a movable head having means for attaching a shell case thereto, means for operating the movable head to force a shell case into the die and extract the same, a fixed recapping pin, means for positioning a cap for the recapping pin, and means for axially adjusting the die in respect to the recapping pin and head.

17. In a tool of the kind described, the combination with a die hinged for movement from a horizontal operative position to an upstanding position and a spring under strain to move the die from its operative position into its upstanding position, of a movable head having means for attaching a shell case thereto, means for operating the movable head to force a shell case into the die and extract the same, a recapping pin, means for positioning a cap for the recapping pin, and means for adjusting the die to align the same with a positioned cap.

18. In a tool of the kind described, the combination with a die, of a sliding head having means for attaching a shell case thereto, a yieldingly retracted cap-feeding slide mounted for transverse sliding movement on said head, a laterally offset cap magazine on said head, said slide having a cap-carrying pocket normally under the magazine, a recapping pin axially aligned with the die, means for operating said head to force the shell case into the die and extract the same, and automatic means operative during the movement of said head to extract the shell case, to project the feed slide and position the cap in its pocket for the recapping pin.

19. In a tool of the kind described, the combination with a die, of a sliding head having means for attaching a shell case thereto, a yieldingly retracted cap-feeding slide mounted for transverse sliding movement on said head, a laterally offset cap magazine on said head, said slide having a cap-carrying pocket normally under the magazine, a recapping pin axially aligned with the die, means for operating said head to force the shell case into the die and extract the same, and automatic yielding means operative during the movement of said head to extract the shell case, to project the feed slide and position the cap in its pocket for the recapping pin.

20. The structure defined in claim 18 in which the column of caps in the magazine is held on said slide during its projecting and retracting movements.

21. In a tool of the kind described, the combination with a die, of a sliding head having means for attaching a shell case thereto, a yieldingly retracted cap-feeding slide mounted for transverse sliding movement on said head, a laterally offset cap magazine on said head, said slide having a cap-carrying pocket normally under the magazine, a recapping pin axially aligned with the die, means for operating said head to force the shell case into the die and extract the same, and a bell crank lever and a co-operating cam, one arm of said bell crank being arranged to engage said slide and the other of said arms being arranged to engage the cam.

22. The structure defined in claim 21 in which the arms of the bell crank are yieldingly connected, whereby the short arm may move while the long arm and slide remain stationary.

23. The structure defined in claim 18 in further combination with a decapping pin carried by the die.

24. The structure defined in claim 18 in further combination with a decapping pin carried by the die, and an escape passageway in the head for the caps removed from shell cases during the decapping action.

25. In a tool of the kind described, the combination with the base, of a horizontally disposed die hinged to the base for movement into an upstanding position, a sliding head on the base having means for attaching a shell case thereto, means for operating the sliding head to force a shell case into the die and extract the same, said base having means for hinging the same to a support, and means for supporting the base in an oblique position.

26. In a tool of the kind described, the combination with a die, of a movable head having means for attaching a shell case thereto, a laterally offset upright cap magazine, a sleeve-like seat in said head into which the lower end of said magazine is removably telescoped, said seat being open at one side to permit the magazine to move into an oblique position, a spring yieldingly holding said magazine in an upright position, means for operating the movable head to force a shell case into the die and extract the same, a yieldingly retracted cap-feeding slide mounted for transverse sliding movement on said head, said slide having a cap-carrying pocket normally under said magazine, a recapping pin, and automatic means for projecting said slide to position the cap in its pocket for the recapping pin.

27. In a tool of the kind described, the combination with a die, of a sliding head having means for attaching a shell case thereto, a cap-feeding slide mounted for transverse sliding movement on said head, a laterally offset cap magazine on said head, said slide having a cap-carrying pocket normally under the magazine, a recapping pin axially aligned with the die, means for operating said head to force the shell case into the die and extract the same, means for projecting said slide to position the cap in its pocket for the recapping pin, and an adjustable stop for said slide to align the cap in its pocket with the cap seat in the shell case in the die.

28. In a tool of the kind described, the combination with a die, of a sliding head having means for attaching a shell case thereto, a cap-feeding slide mounted for transverse sliding movement on said head and having a cap carrying pocket, a laterally offset cap magazine on said head, a screw having threaded engagement with said slide, a coiled spring encircling said screw and operative on said slide to retract the same and position its cap pocket under the cap magazine, a recapping pin, and means for projecting said slide to position the cap in its pocket for the recapping pin, said screw being arranged to engage said head as an adjustable stop to limit the projecting movement of said slide and align the cap in its pocket with the cap seat in the shell case in the die.

29. In a tool of the kind described, the combination with a die, of a sliding head having means for attaching a shell case thereto, a cap-feeding slide mounted for transverse sliding movement on said head, a laterally offset cap magazine on said head, said slide having a cap-carrying pocket normally under the magazine, a recapping pin axially aligned with the die, means for operating said head to force the shell case into the die and extract the same, automatic means for projecting the feed slide and positioning the cap in its pocket for the recapping pin, and an adjustable stop for said slide to align the cap in its pocket with the cap seat in the shell case in the die, said automatic means arranged to yield at the limit of the projecting movement of said slide.

30. In a tool of the kind described, the combination with a die, of a movable head having means for attaching a shell case thereto, an operating lever, and a link connecting said lever to said head, said lever being operative on the head to force the shell case into the die and extract the same, the connection between said lever and link being such as to impart the maximum power to said head during the final movement of the shell case into the die and during the initial extracting movement thereof.

31. The structure defined in claim 30 in further combination with means for attaching the link to the lever at different radial distances from the fulcrum of said lever.

32. In a tool of the kind described, the combination with a die, of a reciprocatory head having means for attaching a shell case thereto, and arranged to force the shell case into the die and extract the same, said die having an adjustable sleeve arranged to engage said head as a stop to limit the movement of said shell case into the die.

33. In a tool of the kind described, the combination with a base, of a cylinder and piston grease gun on the base, said cylinder having a grease chamber, a bullet resizing die extending into said chamber and having a horizontal cylindrical chamber, a plurality of holes in the resizing die leading from the grease chamber to the chamber of the resizing die, a follower in the chamber of said die normally closing said holes, a sliding head on the base, a plunger carried by the sliding head, a bullet-positioning seat at the mouth of the chamber of the resizing die, means for operating the sliding head to cause said plunger to engage a bullet on said seat, force the same into the chamber of the resizing die and force said follower therefrom to open the grease holes, and means operated by the sliding head to return the follower to the chamber in the resizing die and extract the bullet.

34. The structure defined in claim 33 in which said seat axially aligns a bullet thereon with the chamber in the resizing dies.

35. The structure defined in claim 33 in further combination with a slide for conveying bullets to said seat.

36. In a tool of the kind described, the combination with a horizontal die, of a movable head having means for attaching a shell case thereto, a laterally offset cap magazine adapted to support caps, the one upon the other, with their axes extending horizontally, means for operating the movable head to force a shell case into the die and extract the same, a horizontal recapping pin, and automatic means for removing a cap from the magazine and positioning the same for the recapping pin with its axis extending horizontally and aligned with the cap seat in the shell case.

37. In a tool of the kind described, the combination with a die, of means for forcing a shell casing having a contracted neck into the die and extracting the same, said die being arranged to externally resize the neck of the shell case during the movement of the shell case into the die and to internally resize said neck during the extracting movement of the shell case out of the die.

In testimony whereof I affix my signature.

CONSTANTINE V. SCHMITT.